Figure 1:
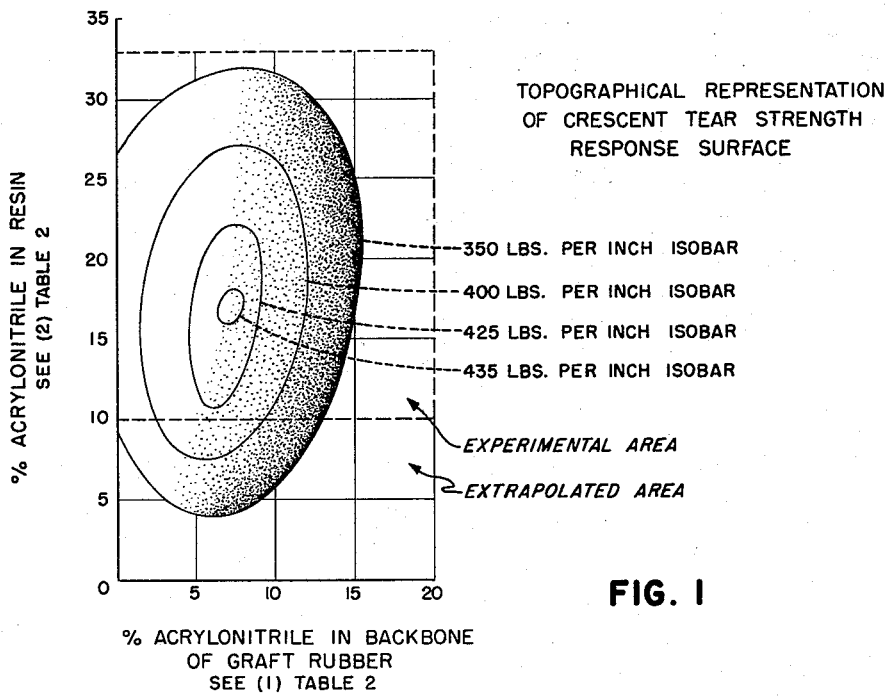

INVENTORS
LLOYD D. HESS, JR.
WILLIAM C. MAST

INVENTORS
LLOYD D. HESS, JR.
WILLIAM C. MAST 3,118,854
**GRAFT COPOLYMER OF STYRENE-ACRYLONI-
TRILE ON BUTADIENE-STYRENE-ACRYLONI-
TRILE COPOLYMER**
Lloyd D. Hess, Jr., Cuyahoga Falls, and William C. Mast, Stow, Ohio, assignors to The Goodyear Tire & Rubber Company, Akron, Ohio
Filed Feb. 25, 1959, Ser. No. 795,452
15 Claims. (Cl. 260—45.5)

This invention relates to dimensionally stable, low temperature impact-resistant rubbery graft polymers produced by forming a resinous acrylonitrile polymer in the presence of a preformed rubbery polymer of a conjugated diene, a vinyl aromatic monomer, and acrylonitrile, and to flexible and ridged blends thereof.

Impact-resistant compositions which are flexible at low temperatures and yet resistant to softening at elevated temperatures are desirable for many uses including skins for cushioned panel covering now being used on the instrument panel areas of automobiles, as sub strata for laminated stock, as a substitute for paper in the manufacture of wall covering, and many other uses. Early attempts to develop such a composition were directed to using the properties of resinous compositions and rubbery compositions in blends of suitable proportions. These resin/rubber blends although satisfactory in some respects were lacking in many properties now desired. For example, it is known that resistance to softening under heat is a property possessed by polystyrene and it would be desirable to develop a shock-resistant composition having the high heat softening property of polystyrene. But styrene resins are brittle, particularly at low temperatures, and consequently have little or no resistance to rupture under impact. On the other hand, it is known that rubbery materials such as the rubbery copolymers of butadiene and styrene are flexible and shock-resistant not only at room temperature but also at temperatures approaching −30° C. and lower. It became known to those skilled in the art that certain advantages are obtained when these materials are blended together in proper proportions. However, when this was attempted with certain resins and rubbers the resulting blends were cheesy or crumbly with consequent loss of the properties of both components because of the incompatible nature of these materials for each other. On the other hand when attempts are made to make these components compatible with each other, then properties intermediate of those possessed by the separate components are developed. Since the physical properties of impact-resistant compositions made of thermoplastic materials of the type mentioned here are dependent upon the temperature in which they are used, it becomes extremely important to develop a composition which is flexible at extremely low temperatures approaching −30° C. and lower, and resistant to softening at extremely high temperatures approaching 100° C. and dimensionally stable even in extremely thin gauges throughout this entire temperature range. Up until the present time very few, if any, resinous compositions were known which were capable of useful application over such a wide range of temperatures.

It has now been discovered that exceptionally desirable thermoplastic compositions can be prepared from blends of different resins and rubbers, particularly those resins and rubbers based upon styrene when blended wholly or in part with the graft rubbery polymer of this invention.

The rubbery styrene graft polymer of this invention is made by first forming a rubbery backbone made by reacting a major proportion, preferably 70 to 90 parts of a conjugated diene hydrocarbon with a minor proportion, preferably 30 to 10 parts of at least two copolymerizable monomers, one of which is a vinyl aromatic hydrocarbon compound such as styrene and the other of which is acrylonitrile which is present in an amount of from 5 to 15 parts per 100 parts of monomer used in making the backbone, and then grafting thereto a resinous polymer, for example the known polymer provided by reacting a major amount of a vinyl aromatic monomer, preferably styrene in amounts from 60 to 80 parts, and a minor amount of acrylonitrile, preferably 20 to 40 parts, in the presence of the preformed rubbery backbone until the reaction is complete. The following example illustrates a preferred manner of making the styrene/acrylonitrile graft rubbery polymer of this invention. All parts are by weight unless otherwise indicated.

EXAMPLE 1

| Components for making rubbery backbone | Parts | + or − |
|---|---|---|
| Water (diluent) | 179.0 | 65.0 |
| Potassium persulfate (polymerization initiator) | 0.3 | 0.2 |
| Sodium stearate (emulsifier) | 3.0 | 1.0 |
| Sodium rosinate (emulsifier) | 2.0 | 1.0 |
| Sodium hydroxide (pH adjustor) | 0.022 | 0.01 |
| Styrene (monomer) | 7.8 | 3.9 |
| Acrylonitrile (monomer) | 7.8 | 3.9 |
| n-Dodecyl mercaptan (modifier activator) | 0.05 | 0.03 |
| t-Dodecyl mercaptan (modifier) | 0.2 | 0.1 |
| Butadiene (monomer) | 62.2 | 7.8 |
| Components used for grafting onto rubbery backbone: | | |
| Styrene (monomer) | 15.5 | 2.2 |
| Acrylonitrile (monomer) | 6.7 | 2.2 |

In making the rubbery backbone, the water was charged to a reactor together with each of the next eight components listed above and then the reactor was flushed with nitrogen to remove trapped air. The butadiene-1,3 was then charged to the reactor. The reaction mixture was then agitated and heated at 125° F. until the reaction was substantially complete, which took about five hours to reach 30% solids, after which time the components enumerated above for grafting onto the rubbery backbone were added to the reactor and heated at 135° F. until 37% solids was formed, after which time the reaction was discontinued by adding a short stopping agent such as 0.2 part of sodium dimethyl dithiocarbamate followed by 1.5 parts of an antioxidant, such as Wingstay S (a commercial mixture of styrenated phenols). The resulting styrene/acrylonitrile graft rubbery polymer may be recovered from its latex by coagulation with $Al_2(SO_4)_3$ or $BaCl_2$ or similar polyvalent metal salts, or the latex may be recovered as a blend with other latices by spray drying the blended latices in such a manner as to flash off the water from the solids.

The rubbery styrene/acrylonitrile graft polymer prepared in accordance with the condition of Example 1 is of value in making a flexible composition when blended with a resinous polymer made from, for example, styrene and particularly resinous copolymers of styrene and acrylonitrile as well as the vinyl resins and the acrylate resins.

The properties of this rubbery styrene/acrylonitrile graft polymer such as its swell index in methyl ethyl ketone may be changed by adding a cross linking agent to the monomers used in preparing the rubbery backbone. In Example 2 below divinyl benzene was used as the cross linking agent. The manner of forming the rubbery backbone and grafting the resin thereto was the same as described for Example 1 with the exception that divinyl benzene was present during the formation of the backbone.

EXAMPLE 2

| Components for making rubbery backbone | Parts | + or − |
|---|---|---|
| Water (diluent) | 179.0 | 65.0 |
| Potassium persulfate (polymerization initiator) | 0.3 | 0.2 |
| Sodium stearate (emulsifier) | 3.0 | 1.0 |
| Sodium rosinate (emulsifier) | 2.0 | 1.0 |
| Sodium hydroxide (pH adjustor) | 0.022 | 0.01 |
| Styrene (monomer) | 7.8 | 3.9 |
| Acrylonitrile (monomer) | 7.8 | 3.9 |
| n-Dodecyl mercaptan (modifier activator) | 0.05 | 0.03 |
| t-Dodecyl mercaptan (modifier) | 0.2 | 0.1 |
| Divinyl benzene (cross linking agent) | 0.3 | 0.1 |
| Butadiene-1,3 (monomer) | 62.2 | 7.8 |
| Components used for grafting onto rubbery backbone: | | |
| Styrene (monomer) | 15.5 | 2.25 |
| Acrylonitrile (monomer) | 6.7 | 2.25 |

The differences in most of the physical properties between the graft polymers of Examples 1 and 2 are slight as may be observed from the values listed below:

Table 1

| | Example 1 | Example 2 |
|---|---|---|
| Divinyl benzene (parts) | 0.0 | 0.3 |
| Tensile (p.s.i.) | 1,170 | 1,040 |
| Elongation (percent) | 290 | 270 |
| Shore hardness: | | |
| A | 88 | 90 |
| D | 39 | 38 |
| Softening point, °F | 84 | 86 |
| Crescent tear (lb./in.) | 225 | 172 |
| Olsen flow (in./min.): | | |
| 290 | 0.76 | 0.75 |
| 320 | 0.93 | 0.94 |
| 350 | 1.04 | 1.15 |
| MEK solubility (percent) | 11.6 | 12.0 |
| MEK swell index | 7.1 | 5.5 |

The conditions of polymerization of the monomers listed above can be any of those normally used in preparing emulsion polymers of this nature. For example, the preparation of the graft rubbery polymer of this invention does not depend upon the particular catalysts or polymerization initiators or modifiers or emulsifiers and the like that are to be used in bringing about their polymerization, but does depend upon the fact that a resinous copolymer is grafted onto a rubbery backbone and in the instant invention it is essential that acrylonitrile be present in the rubbery backbone and still more important is the fact that the acrylonitrile component of the rubbery backbone be present in from about 5 to about 15 parts per 100 parts of total monomer used in making the rubbery backbone. When acrylonitrile is used in making the graft portion of the graft rubber with styrene, acrylonitrile is to be present in from about 20 to about 40 parts per 100 parts of total monomer used in making the grafted portion of the graft polymer of this invention.

In the formulation set forth above in Examples 1 and 2, the column identified as + or − indicates that the amount of material that may be used may be greater than or less than the preferred amount indicated as being used in the examples. Thus, for diluent the amount of water that may be used can range from 114 parts to 244 parts. The same general range of parts for each of the other components is determined in the same way as was determined for water. In each case the total monomer used totals 100 parts.

The importance of the use of from 5 to 15 parts of acrylonitrile in forming the rubbery backbone terpolymer was discovered when blends of the graft rubbery composition of this invention were made with other resinous materials, particularly the resinous copolymer made from styrene and acrylonitrile. Maximum physical properties, particularly tensile strength, elongation, hardness, shear, dimple recovery, Masland cold crack, softening point, and Olsen stiffness, are developed when 10 parts of acrylonitrile are used with 10 parts of styrene and 80 parts of butadiene-1,3 in preparing the rubbery tripolymer backbone upon which is then grafted the copolymer of 70 parts of styrene and 30 parts of acrylonitrile in a ratio of 3.5 parts of backbone to 1 part of graft as may be observed from the data presented in Table 2 below.

Each of the 12 blends listed in Table 2 was made by blending 52 parts of the graft polymer made in accordance with Example 2 above with 32 parts of the resinous copolymer made in accordance with Example 3 below, together with 15.7 parts of plasticizer which in this case was the rubbery polymer of 33 parts of acrylonitrile and 67 parts of butadiene made in accordance with Example 4 below in a Banbury, together with 0.3 part of the antioxidant Wingstay S, and then working at temperatures of 300° F. until a smooth and soft plastic mixture was obtained. Pigments, fillers, plasticizers, etc. may be added as desired. Each of the seven physical properties measured on each of the 12 blends was measured in accordance with regular ASTM standards with the exception of the Masland cold crack test.

In each of the blends tested and reported in Table 2, the styrene/acrylonitrile resinous polymer component was made in accordance with the following formula with only the acrylonitrile content varying as indicated in Table 2:

EXAMPLE 3

TYPICAL FORMULA FOR STYRENE/ACRYLONITRILE POLYMER

| | Parts | + or − |
|---|---|---|
| Water | 180.0 | 65.0 |
| Potassium persulfate | 0.3 | 0.2 |
| Sodium rosinate | 5.0 | 2.0 |
| Sodium hydroxide | 0.022 | 0.01 |
| Styrene | 70.0 | 10.0 |
| Acrylonitrile | 30.0 | 10.0 |
| t-Dodecyl mercaptan | 0.2 | 0.1 |

The first four components were charged to a reactor after which it was flushed out with nitrogen, to which then was added the next three components and the reaction mixture allowed to polymerize to 37% solids, after which time 0.2 part of sodium dimethyl dithiocarbamate together with 1.5 parts of Wingstay S were added to the mixture. The 15.7 parts of acrylonitrile rubbery plasticizer component used in the blends of Table 2 was prepared in accordance with the formula set forth in Example 4 below.

EXAMPLE 4

| | Parts |
|---|---|
| Water (diluent) | 200.0 |
| Potassium persulfate | 0.3 |
| Nacconol NR [1] | 0.5 |
| Tamol N [2] | 2.5 |
| Acrylonitrile | 33.0 |
| t-Dodecyl mercaptan | 0.2 |
| Butadiene | 67.0 |

[1] Dodecylbenzene sulfonate-sodium salt.
[2] Sodium salt of condensed naphthalene sufonate and formaldehyde.

The first six ingredients were charged to a closed reactor which was then flushed out with nitrogen to remove trapped air and then the butadiene was charged and the mixture reacted to 32% solids at 125° F. (approximately 12–15 hours). The cooled latex protected with 1.5 parts of Wingstay S was coagulated and dried.

Figure 2:
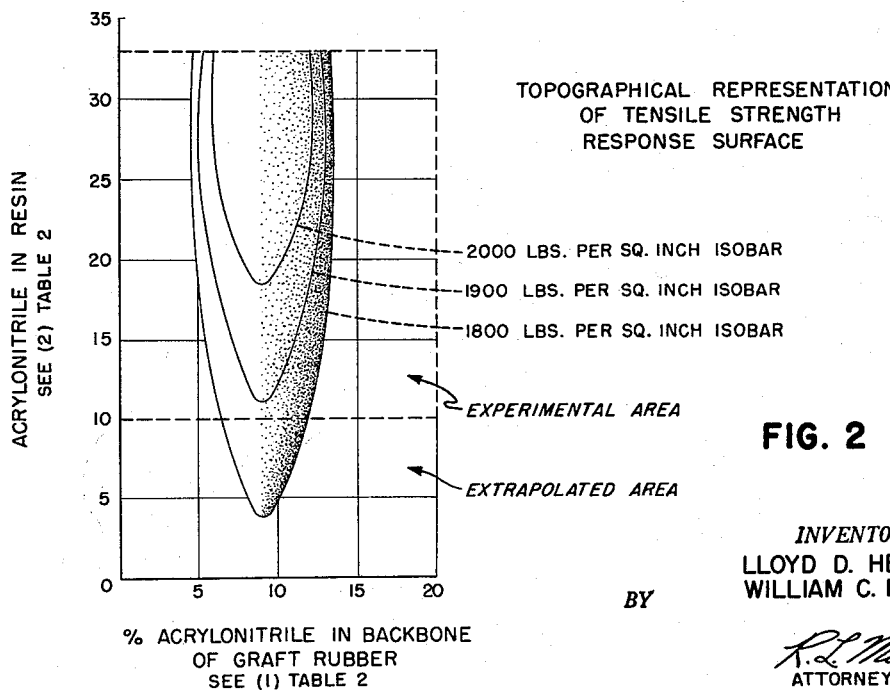
Figure 3:
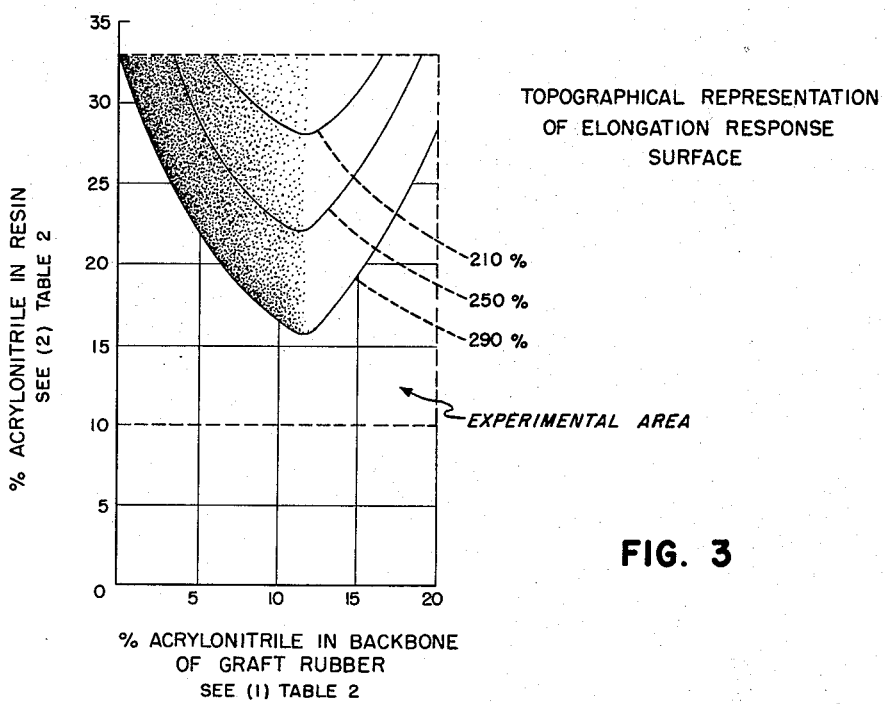
Figure 4:
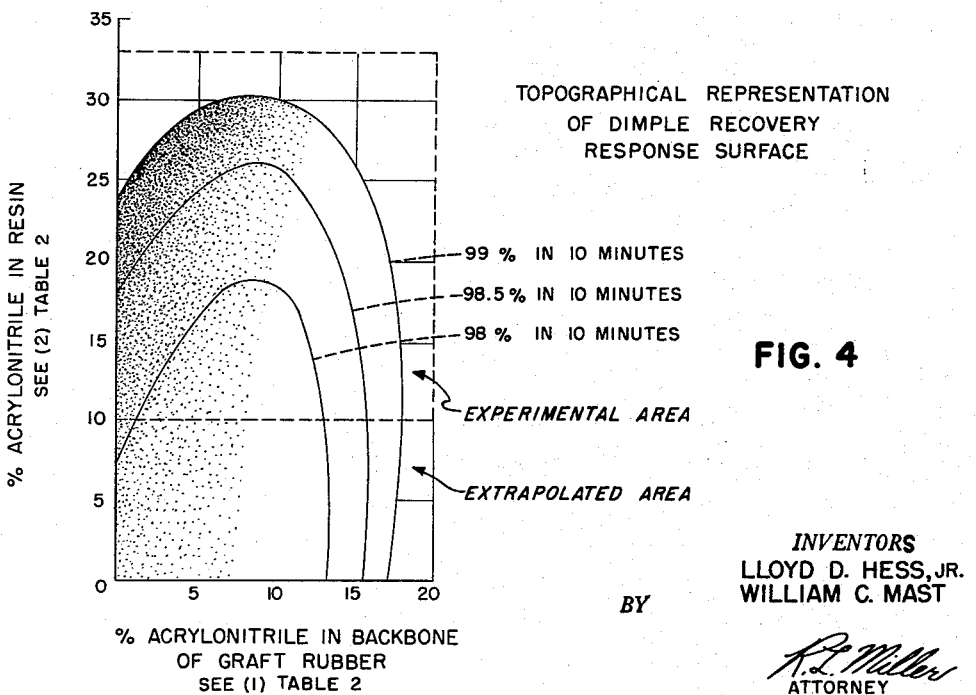
Figure 5:
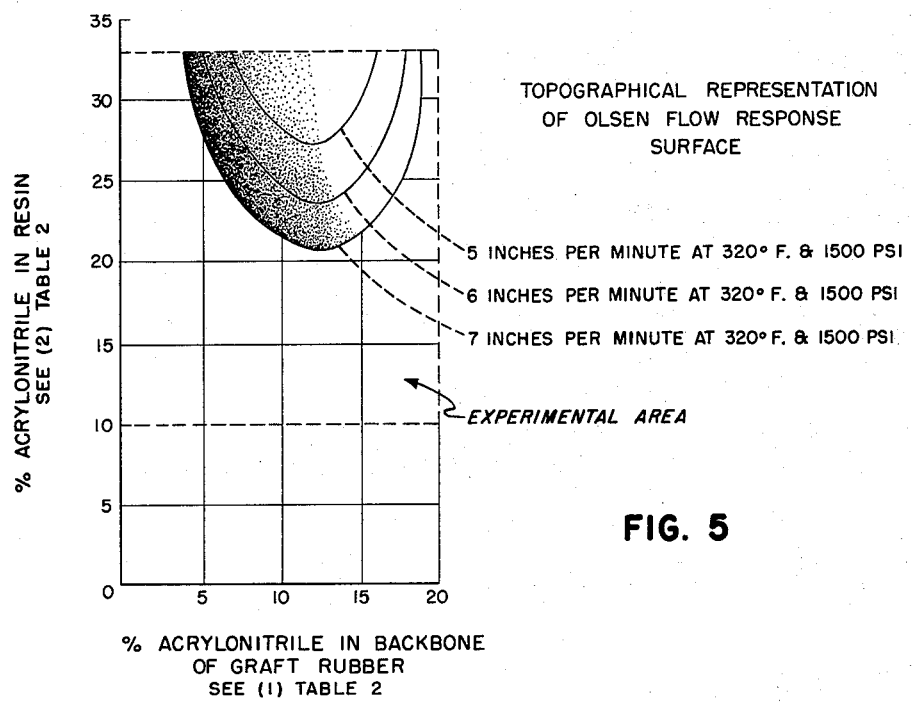
Figure 6:
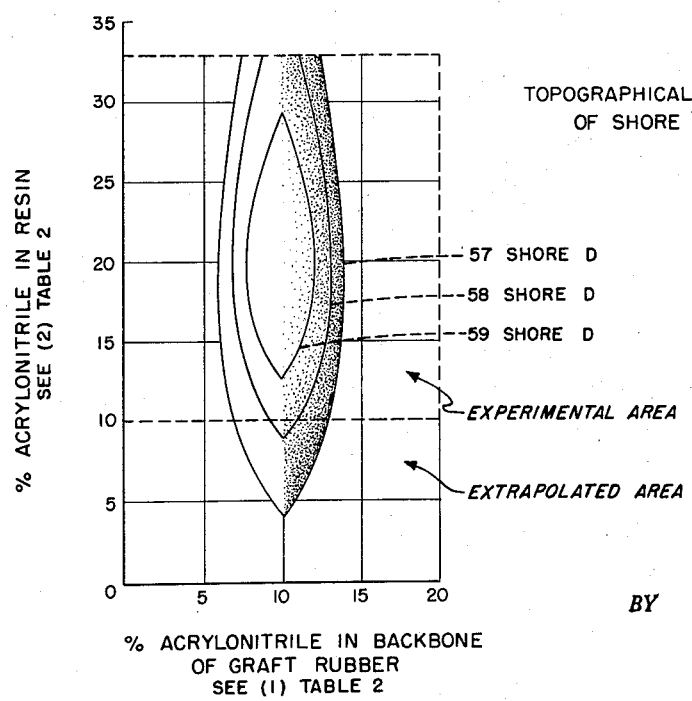

A topographical representation of tear strength response surface in pounds per inch has been plotted as set forth in FIG. 1 of the drawing derived from the crescent tear data of Table 2;

A topographical representation of tensile strength response surface in pounds per square inch has been plotted as set forth in FIG. 2 of the drawing derived from the tensile data of Table 2;

A topographical representation of elongation response surface in percent has been plotted as set forth in FIG. 3 of the drawing derived from the elongation data of Table 2;

A topographical representaiton of dimple recovery response surface in percent has been plotted as set forth in FIG. 4 of the drawing derived from the dimple recovery test data of Table 2;

A topographical representation of Olsen flow has been plotted as set forth in FIG. 5 of the drawing derived from Olsen flow test data of Table 2; and A topographical representation of Shore D hardness has been plotted as set forth in FIG. 6 of the drawing.

In each of the graphs shown in FIGS. 1 through 6, the topographical representations were made in accordance with the method described by G.E.P. Box in Journal of Applied Statistics 6, 3–23 (1957), and by O. L. Davies in Industrial Statistics, chapter 11 (second edition, 1954).

In each of the graphs shown in FIGS. 1 through 6, the relationship between the response (property being measured i.e. tensile strength, shear, etc.) and the amount of acrylonitrile in the backbone of the graft polymer and the amount of acrylonitrile in the resin blended with the graft polymer is represented by a solid area or response surface which in the case of FIGS. 1, 2, and 6 the response surface rises up out of the plane of the paper to form a mound and in the case of FIGS. 3, 4, and 5 the response surface recedes from the plane of the paper to form a dish. The height of the mound at any particular point represents the tear strength (FIG. 1), tensile strength (FIG. 2), and the hardness (FIG. 6) at some set of conditions, two of which have been indicated by the ordinate and abscissa of these graphs. The depth of the dish at any particular point represents the elongation (FIG. 3), dimple recovery (FIG. 4), and Olsen flow (FIG. 5) at the same set of conditions as used for the data represented in FIGS. 1, 2, and 6.

The blends used in obtaining the data reported in Table 2 were made as follows:

Fifty-two parts of the latex solids of Example 2 were blended with 32 parts of the latex solids of Example 3 and reduced to solids by spray drying in the presence of 0.3 part of Wingstay S. The resulting solids is mixed with 15.7 parts of the butadiene/acrylonitrile rubbery copolymer of Example 4 by milling at 300° F. for ten minutes to produce a smooth blend. This resulting thermoplastic blend was used in obtaining the data of Table 2 in accordance with standard ASTM procedure and other established methods of testing. In each of the FIGS. 1 through 6 the broken line represents the limit of actual experimental investigation. The lines extending outside of these broken lines represent extra-polation of the results that would be expected to be obtained should the acrylonitrile content in both the resin component of the blend and the rubber backbone of the graft rubber be altered as indicated. It is to be observed that with respect to the acrylonitrile content of the backbone of the graft rubber polymer optimum results are obtained generally when about 10% of acrylonitrile is present in the backbone. It will further be observed that for the various physical properties plotted in FIGS. 1 through 6 the acrylonitrile content variation is dependent more upon the acrylonitrile content in the rubbery backbone of the graft rubber polymer than in the resin component of the blend.

The butadiene/acrylonitrile rubbery copolymer com-

*Table 2*

PHYSICAL PROPERTIES OF A BLEND OF 52 PARTS OF GRAFT RUBBER [1] AND 32 PARTS OF STYRENE ACRYLONITRILE RESIN [2] AND 15.7 PARTS OF RUBBERY ACRYLONITRILE/BUTADIENE COPOLYMER PLASTICIZER

| Examples | Composition | | Tensile, p.s.i. | Elongation (percent) | Hardness, Shore D | Crescent tear, lb./in. | Dimple test, percent recovered in 10 mins. | Olsen stiffness | Soft Masland, pt. cold crack [3] | | | |
|---|---|---|---|---|---|---|---|---|---|---|---|---|
| | Graft rubber,[1] backbone, percent butadiene(B)/ percent styrene(S)/ percent acrylonitrile(A) | Resin,[2] percent styrene(S)/ percent acrylonitrile(A) | | | | | | | ° C. | ° F | | |
| | B S A | S A | | | | | | | | −20 | −30 | −40 |
| 5 | 80 / 20 / 0 | 90 / 10 | 1,835 | 235 | 58 | 407 | 98.3 | 1.88 | 83.5 | D | D | D |
| 6 | 80 / 20 / 0 | 70 / 30 | 1,925 | 170 | 56 | 322 | 98.8 | 1.24 | 78.5 | E | E | D |
| 7 | 80 / 0 / 20 | 90 / 10 | 1,460 | 177 | 50 | 230 | 99.4 | 1.12 | 85.0 | D | A | D |
| 8 | 80 / 0 / 20 | 70 / 30 | 1,900 | 132 | 54 | 249 | 99.9 | .90 | 92.5 | E | D | D |
| 9 | 80 / 10 / 10 | 80 / 20 | 1,980 | 257 | 61 | 433 | 98.0 | 2.28 | 85.0 | E | E | E |
| 10 | 80 / 15 / 5 | 73 / 27 | 1,870 | 305 | 52 | 358 | 99.0 | 1.60 | 85.0 | D | D | D |
| 11 | 80 / 5 / 15 | 73 / 27 | 1,885 | 210 | 54 | 360 | 99.4 | 1.94 | 88.0 | D | D | D |
| 12 | 80 / 15 / 5 | 67 / 33 | 1,925 | 245 | 53 | 321 | 99.1 | 1.50 | 92.0 | D | D | D |
| 13 | 80 / 5 / 15 | 67 / 33 | 1,865 | 165 | 54 | 314 | 99.5 | 1.58 | 92.0 | D | D | D |
| 14 | 80 / 10 / 10 | 70 / 30 | 2,215 | 220 | 57 | 380 | 99.6 | 1.58 | 90.0 | D | D | D |
| 15 | 80 / 15 / 5 | 75 / 25 | 1,920 | 240 | 60 | 378 | | | 95.5 | E | D | D |
| 16 | 80 / 5 / 15 | 75 / 25 | 1,875 | 250 | 59 | 352 | | | 92.5 | D | D | D |

[1] Graft rubber as prepared in Example 2 having variations in the backbone as listed above.
[2] Resin as prepared in Example 3 having styrene/acrylonitrile ratios as listed above.
[3] A test sample of the blend 2″ x 6″ x .03″ is folded across its narrow dimension and subjected to an impact force produced by a seven pound 12 inch arm pivoted to swing freely from a vertical to a horizontal position. The effects of this force are identified as follows:
  AA—Shattered into 3 or more pieces.
  A—Cracked into 2 pieces.
  B—Cracked along crease but still in one piece.
  C—Slight crack along crease.
  D—Smoke line along crease.
  E—No visible effect.

ponent of the blend is used as a plasticizer for the resin and for the graft rubber components of the blend used in reporting the values set forth in FIGS. 1 through 6 and any other suitable plasticizer may be used without changing the basic observations made with respect to the acrylonitrile content needed in the backbone of the graft polymer in producing the optimum properties disclosed in FIGS. 1 through 6. Thus, other solid plasticizers may be used which impart the desired degree of flexibility, elongation, and flow to the composition. Generally speaking, the composition may contain not less than about 5% and not more than about 25% plasticizer depending upon the particular plasticizer being used.

The ratio of the graft portion on the backbone may range in amount from 2.5 to 4.5 parts of rubbery backbone per part of graft portion. When the ratio of backbone to graft is less than 2.5 the graft rubber becomes too brittle, has poor dimple recovery, and lower elongation. When this ratio exceeds 4.5 then the graft rubber loses its unique properties in regard to tear strength, tensile strength, and compatibility control with other rubbers and resins.

The graft rubbery polymer of this invention may also be blended with polyvinyl chloride to give a material which may be processed at a lower temperature, about 250° F., than is needed to process the blends of Table 2 at about 300° F. while still retaining many of the low temperature impact resistant properties and also being resistant to softening at elevated temperatures.

The following components were used in making a blend of a graft rubbery polymer made in accordance with Example 2 above with polyvinyl chloride.

EXAMPLE 17

| Ingredients: | Parts |
|---|---|
| Styrene/acrylonitrile 70/30 resin (made according to Example 3) | 13.7 |
| PVC (polyvinyl chloride of .50 intrinsic viscosity) | 26.6 |
| Graft rubbery polymer (made according to Example 2) | 48.4 |
| Plasticizer (butadiene/acrylonitrile polymer) (made according to Example 4) | 9.0 |
| Antioxidant (Wingstay S) | 1.0 |
| Plasticizer (Paraplex G-60) (Polyester glycol resin) | 1.3 |

These components were blended on a plastics mill at 250° F. until a smooth mixture was obtained. The above blend had the following physical properties:

*Table 3*

|  | PVC modified blend | Example 14 blend |
|---|---|---|
| Tensile strength, p.s.i. | 2,150 | 2,215 |
| Elongation, percent | 230 | 220 |
| Hardness, Shore D | 63 | 57 |
| Softening point, °F | 158 | 200 |
| Crescent tear strength, lb./in | 447 | 380 |
| Elmendorf tear strength, lb./in | 193 | 51 |
| Masland cold flex, °F: | | |
| 0 | E | [a] E |
| -10 | E | E |
| -30 | E | E |
| -40 | E | E |
| Specific gravity | 1.2313 | 1.088 |
| Shrinkage, percent, 96 hr. at 190° F.: | | |
| Length | 1.67 | 0 |
| Transverse | 1.33 | 0 |
| Fog Test [b] | (c) | (c) |
| Weatherometer, 100 hrs. plus Fadeometer, 100 hrs. [d] | (e) | (e) |
| Tensile, 70 hrs. at 158° F., p.s.i. | 2,150 | 2,370 |
| Elongation, 70 hrs. at 158° F., percent | 240 | 200 |
| Shore D, 70 hrs. at 158° F | 62 | 57 |

[a] E=No visible effect.
[b] Place sample under glass and expose to ultraviolet light for 16 hours. If glass remains clear then no fogging has occurred.
[c] No Fogging.
[d] Rating made on change in color and stiffness.
[e] No Change.

These polyvinyl chloride blends also had very desirable dimple recovery, were easily embossed, and readily postformed.

Other blends of the graft rubbery polymer of this invention may also be made with any of the well known nitrile rubbers, any of the diene rubbers including polybutadiene, the rubbery butadiene/styrene copolymers, polystyrene, the polyacrylates, as well as the well known resinous copolymers of styrene and acrylonitrile, particularly when made using about 70 parts of styrene and about 30 parts of acrylonitrile.

The examples set forth in Table 2 above are flexible over a wide temperature range of from −50° F. to 200° F. Conversely rigid blends may also be made having unique properties over a similarly wide range of temperature, including resistance to impact, high stiffness, high hardness, and high softening point, and may be observed from the data set forth in Table 4 below.

*Table 4*

PHYSICAL PROPERTIES OF A BLEND OF 35 PARTS OF GRAFT RUBBER (EXAMPLE 2) 65 PARTS OF STYRENE/ACRYLONITRILE RESIN (EXAMPLE 3), AND 1.0 PART OF WINGSTAY S

| Examples | Composition | | Tensile strength, p.s.i., av. | Elongation, percent, av. | Hardness, Shore D | Izod impact strength notched, ft.lb./in. | Heat distortion temperature, °F., 66 p.s.i. | Olsen flow 1,500 p.s.i., in./min. at 320° F. |
|---|---|---|---|---|---|---|---|---|
| | Backbone, percent butadiene (B)/ percent styrene (S)/ percent acrylonitrile (A) | Resin, percent styrene (S)/ percent acrylonitrile (A) | | | | | | |
| | B S A | S A | | | | | | |
| 18 | 80/20/0 | 90/10 | 3,307 | 40 | 78 | 0.6 | 193 | 20.0 |
| 19 | 80/ 0/20 | 90/10 | 3,058 | 44 | 77 | 0.7 | 192 | 20.0 |
| 20 | 80/20/0 | 70/30 | 3,706 | 67 | 79 | 8.5 | 210 | 3.0 |
| 21 | 80/ 0/20 | 70/30 | 3,583 | 30 | 77 | 8.5 | 200 | 3.6 |
| 22 | 80/10/10 | 80/20 | 4,250 | 13 | 80 | 0.8 | 204 | 10.9 |
| 23 | 80/15/5 | 73/27 | 3,714 | 22 | 77 | 2.3 | 196 | 6.0 |
| 24 | 80/ 5/15 | 73/27 | 4,238 | 21 | 75 | 1.6 | 193 | 7.5 |
| 25 | 80/15/5 | 67/33 | 4,151 | 44 | 76 | 5.1 | 201 | 5.7 |
| 26 | 80/ 5/15 | 67/33 | 4,260 | 20 | 77 | 1.0 | 202 | 4.8 |
| 27 | 80/10/10 | 70/30 | 4,048 | 41 | 75 | 2.0 | 199 | 10.0 |

The rubbery graft polymer of this invention is useful in blends with resinous polymers including polystyrene, the polyacrylates, and copolymers of styrene and acrylonitrile. The ratio of the rubbery graft polymer to resinous polymer in the blends may vary from 8:1 to 1:8. The flexible blends are produced from ratios of 8:1 to 3:1; the semi-rigid blends are produced from ratios of 3:1 to 1:2; and the rigid blends are produced from 1:2 to 1:8 of rubbery graft polymer to resinous polymer in all cases. Typical uses for the flexible blends include decorative film for wall covering in gauges from 3 to 10 mils; crash pad skins for automotive paneling in gauges from 25 to 35 mils; as decorative furniture finish particularly when bonded by heat or adhesive to a substrate of wood; decorative finish for metals used in card tables, automotive paneling; and for extruded goods such as garden hose which possess the desirable property of remaining flexible at below 32° F. The semi-rigid blends are readily adapted to such uses as molded shoe heels, electrical conduit, water pipe, and border trim for gardens. Typical uses for the rigid blends include extruded or calendered embossed sheeting which sheeting may be used for paneling and other constructional uses, post formed into refrigerator liners, automotive scuff pads, seat end shields, and head liners, as well as for many other articles of household use such as dishes, trays, and the like. Rigid pipes may be extruded from the rigid shock. These blends are also readily injection molded into a wide variety of useful articles, such as cups and buckets.

While certain representative embodiments and details have been shown for the purpose of illustrating the invention, it will be apparent to those skilled in this art that various changes and modifications may be made therein without departing from the spirit or scope of the invention.

What is claimed is:

1. A rubbery graft copolymer comprising polymer (A) formed in the presence of from 2.5 to 4.5 parts of polymer (B) per part of polymer (A), polymer (A) resulting from the polymerization of a mixture of monomers comprising from about 60 to 80 parts of styrene monomer and from about 40 to 20 parts of acrylonitrile, said monomers used in making polymer (A) being present in an amount sufficient to total 100 parts; and polymer (B) resulting from the polymerization of a mixture of monomers comprising from about 70 to 90 parts of a butadiene hydrocarbon and a minor proportion of at least two other monomers copolymerizable with the butadiene hydrocarbon, one of which is acrylonitrile present in an amount of from 5 to 15 parts, the other monomer of which is styrene, said monomers used in making polymer (B) being present in an amount sufficient to total 100 parts.

2. A rubbery graft copolymer comprising polymer (A) formed in the presence of from 2.5 to 4.5 parts of polymer (B) per part of polymer (A), polymer (A) resulting from the polymerization of a mixture of monomers comprising from about 60 to 80 parts of styrene monomer and from about 40 to 20 parts of acrylonitrile, said monomers used in making polymer (A) being present in an amount sufficient to total 100 parts; and polymer (B) resulting from the polymerization of a mixture of monomers comprising from about 70 to 90 parts of a butadiene hydrocarbon and a minor proportion of at least two other monomers copolymerizable with the butadiene hydrocarbon, one of which is styrene monomer, and the other of which is acrylonitrile present in an amount of from 5 to 15 parts, said monomers used in making polymer (B) being present in an amount sufficient to total 100 parts.

3. The graft copolymer of claim 2 in which styrene monomer in each instance is styrene.

4. The graft copolymer of claim 2 in which a butadiene hydrocarbon monomer is butadiene-1,3.

5. The graft copolymer of claim 4 in which polymer (B) is made in the presence of divinyl benzene.

6. A rubbery graft copolymer comprising polymer (A) formed in the presence of from 2.5 to 4.5 parts of polymer (B) per part of polymer (A), polymer (A) resulting from the polymerization of a mixture of monomers comprising 15.5 parts of styrene, and 6.7 parts of acrylonitrile; and polymer (B) resulting from the polymerization of a mixture of monomers comprising 62.2 parts of butadiene-1,3; 7.8 parts of styrene; and 7.8 parts of acrylonitrile, said monomers used in making said graft polymer being present in an amount sufficient to total 100 parts.

7. A composition comprising a blend of the graft copolymer of claim 1 with a resinous polymer of a monomer selected from the group consisting of vinyl chloride; styrene; and a mixture of styrene and acrylonitrile; the ratio of graft polymer to resinous polymer ranging from 1:8 to 8:1.

8. A composition comprising a blend of the graft copolymer of claim 1 with a resinous polymer resulting from the polymerization of a mixture comprising 70 parts of styrene and 30 parts of acrylonitrile, the ratio of graft polymer to resinous polymer ranging from 1:8 to 8:1.

9. A composition comprising a blend of the graft copolymer of claim 1 with a resinous polymer of a monomer selected from the group consisting of vinyl chloride; styrene; and a mixture of styrene and acrylonitrile; the ratio of graft polymer to resinous polymer ranging from 8:1 to 3:1.

10. A composition comprising a blend of the graft copolymer of claim 1 with a resinous polymer of a monomer selected from the group consisting of vinyl chloride; styrene; and a mixture of styrene and acrylonitrile; the ratio of graft polymer to resinous polymer ranging from 1:2 to 1:8.

11. A composition comprising a blend of 52 parts of the graft copolymer of claim 4 with 32 parts of a resinous copolymer of styrene and acrylonitrile and as a plasticizer therefor the rubbery copolymer of acrylonitrile and butadiene.

12. A composition comprising a blend of the graft copolymer of claim 6 with a resinous polymer resulting from the polymerization of a mixture containing 70 parts of styrene and 30 parts of acrylonitrile, and as a plasticizer therefor the rubbery copolymer of acrylonitrile and butadiene, the ratio of graft polymer to resinous polymer ranging from 1:8 to 8:1.

13. A composition comprising a blend of 52 parts of the graft copolymer of claim 6 with 32 parts of a resinous polymer resulting from the polymerization of a mixture comprising 70 parts of styrene and 30 parts of acrylonitrile and 15.7 parts of the rubbery copolymer of acrylonitrile and butadiene.

14. A method of making a dimensionally stable graft copolymer which comprises polymerizing a mixture containing styrene and acrylonitrile in the presence of a rubbery polymer previously formed by polymerizing a mixture containing 10 to 30 parts of styrene monomer, 90 to 70 parts of a conjugated diene monomer, and 5 to 15 parts of acrylonitrile, the monomers used in making said rubbery polymer being present in an amount sufficient to total 100 parts.

15. A dimensionally stable sheet of the blend of claim 8 having a thickness of less than 0.1 inch.

References Cited in the file of this patent
UNITED STATES PATENTS
2,802,808  Hayes _____ Aug. 13, 1957

OTHER REFERENCES

Krczil: "Kurzes-Handbuch der Polymerisationstechnik," Bd. II, Mehrstoffpolymerisation, Akademische Ver. Leipzig, 1941, pages 157–161.